(12) United States Patent
Yamada et al.

(10) Patent No.: US 9,811,009 B2
(45) Date of Patent: Nov. 7, 2017

(54) ELECTROPHOTOGRAPHIC MEMBER, PROCESS CARTRIDGE AND ELECTROPHOTOGRAPHIC APPARATUS

(71) Applicant: CANON KABUSHIKI KAISHA, Tokyo (JP)

(72) Inventors: Masaki Yamada, Mishima (JP); Sosuke Yamaguchi, Susono (JP); Hideya Arimura, Suntou-gun (JP); Kazuhiro Yamauchi, Suntou-gun (JP); Satoru Nishioka, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/708,981

(22) Filed: May 11, 2015

(65) Prior Publication Data

US 2015/0331339 A1    Nov. 19, 2015

(30) Foreign Application Priority Data

May 16, 2014    (JP) ................................ 2014-102659

(51) Int. Cl.
*G03G 5/04*    (2006.01)
*G03G 15/00*    (2006.01)
(Continued)

(52) U.S. Cl.
CPC .......... *G03G 5/043* (2013.01); *C09D 175/04* (2013.01); *G03G 5/0575* (2013.01);
(Continued)

(58) Field of Classification Search
None
See application file for complete search history.

(56) References Cited

U.S. PATENT DOCUMENTS 5,933,693 A    8/1999   Sakata et al.
8,655,222 B2   2/2014   Nakamura et al.
(Continued)

FOREIGN PATENT DOCUMENTS

CN    10216857    10/2011
CN    103282838    9/2013
(Continued)

OTHER PUBLICATIONS

English text machine translation of Naito et al., JP 2005-085601 A; accessed on the JPO AIPN website on Jan. 4, 2017, copy attached as a PDF, pp. 1-6.*

(Continued)

*Primary Examiner* — Katie L Hammer
(74) *Attorney, Agent, or Firm* — Fitzpatrick Cella Harper and Scinto

(57) ABSTRACT

The present invention provides an electrophotographic member in which an increase in resistance is small even in use at low temperature and which contributes to the formation of a high quality electrophotographic image, and a process cartridge and an electrophotographic apparatus using this electrophotographic member as a charging member or a developer carrying member. Therefore, the electrophotographic member of the present invention is an electrophotographic member including an electro-conductive mandrel and an electro-conductive layer, wherein the electro-conductive layer includes a urethane resin and an ion-conductive agent, the urethane resin has, between two adjacent urethane bonds, a structure represented by formula (1) and at least one structure selected from the group consisting of a structure represented by formula (2) and a structure represented by formula (3), and the ion-conductive agent contains a particular anion.

3 Claims, 4 Drawing Sheets

(51) Int. Cl.
  *B05C 1/08* (2006.01)
  *C09D 175/04* (2006.01)
  *G03G 5/043* (2006.01)
  *G03G 5/05* (2006.01)
  *G03G 15/02* (2006.01)
  *G03G 15/08* (2006.01)
  *G03G 15/16* (2006.01)

(52) U.S. Cl.
  CPC ..... *G03G 15/0233* (2013.01); *G03G 15/0818* (2013.01); *G03G 15/162* (2013.01); *G03G 15/1685* (2013.01)

(56) References Cited

U.S. PATENT DOCUMENTS

| | | | |
|---|---|---|---|
| 8,874,012 B2 | 10/2014 | Yamada et al. | |
| 2004/0024166 A1* | 2/2004 | Hattori | C08G 18/4866 528/66 |
| 2007/0197362 A1 | 8/2007 | Sakata et al. | |
| 2010/0158564 A1 | 6/2010 | Nakamura et al. | |
| 2012/0195631 A1* | 8/2012 | Yamada | G03G 15/0818 399/111 |
| 2013/0266338 A1 | 10/2013 | Taniguchi et al. | |
| 2014/0221184 A1 | 8/2014 | Arimura et al. | |
| 2014/0287899 A1 | 9/2014 | Nishioka et al. | |
| 2015/0331341 A1 | 11/2015 | Yamaguchi et al. | |
| 2015/0331342 A1 | 11/2015 | Yamaguchi et al. | |

FOREIGN PATENT DOCUMENTS

| | | | |
|---|---|---|---|
| CN | 104011600 | | 8/2014 |
| EP | 0 684 613 A2 | | 11/1995 |
| EP | 2 348 367 A1 | | 7/2011 |
| JP | 57-5047 A | | 1/1982 |
| JP | 11-209633 A | | 8/1999 |
| JP | 2003-270926 A | | 9/2003 |
| JP | 2005085601 A | * | 3/2005 |
| JP | 2007-206443 A | | 8/2007 |
| JP | 2007-297438 A | | 11/2007 |
| JP | 2008-58622 A | | 3/2008 |
| JP | 4392745 B2 | | 1/2010 |
| JP | 2011-118113 A | | 6/2011 |

OTHER PUBLICATIONS

European Search Report dated Aug. 5, 2015 in European Application No. 15167804.2.

* cited by examiner

ELECTROPHOTOGRAPHIC MEMBER, PROCESS CARTRIDGE AND ELECTROPHOTOGRAPHIC APPARATUS

BACKGROUND OF THE INVENTION

Field of the Invention

The present invention relates to an electrophotographic member used in an electrophotographic apparatus, and a process cartridge and an electrophotographic apparatus having the electrophotographic member.

Description of the Related Art

In an electrophotographic apparatus (a copier, a facsimile, a printer or the like using an electrophotographic system), an electrophotographic photosensitive member (hereinafter also referred to as a "photosensitive member") is charged by a charging unit and exposed by a laser or the like, and as a result, an electrostatic latent image is formed on the photosensitive member. Then, toner in a developing container is applied to a developer carrying member by a toner supply roller and a toner regulating member. The electrostatic latent image on the photosensitive member is developed in the contact portion or proximal portion of the photosensitive member and the developer carrying member with the toner conveyed to a developing region by the developer carrying member. Then, the toner on the photosensitive member is transferred to recording paper by a transfer unit and fixed by heat and pressure, and the toner remaining on the photosensitive member is removed by a cleaning blade.

In an electrophotographic apparatus that is an image forming apparatus adopting an electrophotographic system, electro-conductive members are used in various applications, for example, as electro-conductive rollers such as a charging roller, a developing roller and a transfer roller. The electrical resistance values of these electro-conductive rollers need to be controlled to $10^5$ to $10^9 \Omega$ regardless of the use conditions and the use environment. In order to adjust electro-conductivity, an electro-conductive layer in which electro-conductive particles typified by carbon black, or an ion-conductive agent such as a quaternary ammonium salt compound is added is provided. These two conductive agents each have advantages and disadvantages.

Advantages of an electron-conductive member obtained by adding electro-conductive fine particles such as carbon black are that the change in the electrical resistance value in the use environment is small, and the possibility of contaminating other members in contact with the electron-conductive member is low. But, on the other hand, a problem is that electro-conductive particles such as carbon black are difficult to uniformly disperse, and local low resistance sites may occur.

In an ion-conductive member obtained by adding an ion-conductive agent, the unevenness of the electrical resistance value caused by the dispersion unevenness of the conductive agent can be reduced, and local low resistance sites are less likely to occur, compared with the electron-conductive member. On the other hand, a problem is that the resistance is likely to fluctuate depending on the environment, and therefore, the desired resistance value of the ion-conductive member may not be obtained in a low temperature and low humidity environment.

As a measure for suppressing environmental fluctuations of resistance in an ion-conductive agent, Japanese Patent No. 4392745 discloses a method using an ionic liquid having a particular chemical structure for a rubber composition.

In addition, Japanese Patent Application Laid-Open No. 2011-118113 discloses a method using an ionic liquid having a hydroxyl group for a urethane resin composition.

In recent years, an electrophotographic apparatus is required to be able to maintain high image quality and high durability even in a more severe environment.

An electro-conductive layer containing an ionic liquid is excellent in suppressing resistance fluctuations depending on the environment, but the electro-conductivity may decrease in a low temperature environment around 0° C.

According to the study of the present inventors, particularly in the case of use in a low temperature environment around 0° C., either the ionic liquid described in Japanese Patent No. 4392745 or the composition described in Japanese Patent Application Laid-Open No. 2011-118113 may cause the adverse effect of an increase in resistance on an electrophotographic image.

SUMMARY OF THE INVENTION

The present invention is directed to providing an electrophotographic member in which an increase in resistance is small even in use in a low temperature environment around 0° C. and which contributes to the formation of a high quality electrophotographic image.

Further, the present invention is directed to providing an electrophotographic apparatus that can stably output a high quality electrophotographic image, and a process cartridge used in an electrophotographic apparatus.

The present inventors have studied diligently over and over in order to achieve the above objects. As a result, the present inventors have found that a combination of a urethane resin having a particular structure and an ion-conductive agent having a particular anion can suppress an increase in resistance in a low temperature environment, and made the present invention.

According to one aspect of the present invention, there is provided an electrophotographic member including an electro-conductive mandrel and an electro-conductive layer, wherein the electro-conductive layer includes a urethane resin and an ion-conductive agent, the urethane resin has, between two adjacent urethane bonds, a structure represented by the following structure (1) and at least one structure selected from the group consisting of a structure represented by the following structure (2) and a structure represented by the following structure (3), and the ion-conductive agent contains at least one anion selected from a fluorinated sulfonylimide anion, a fluorinated sulfonylmethide anion, a fluorinated sulfonate anion, a fluorinated carboxylate anion, a fluorinated borate anion, a fluorinated phosphate anion, a fluorinated arsenate anion, a fluorinated antimonate anion, a dicyanamide anion and a bis(oxalato) borate anion.

structure (1)

structure (2)

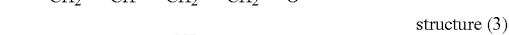

structure (3)

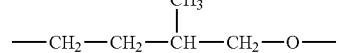

According to another aspect of the present invention, there is provided a process cartridge removable from an electrophotographic apparatus, wherein a charging member or a developer carrying member constituting the process cartridge is the above electrophotographic member.

According to further aspect of the present invention, there is provided an electrophotographic apparatus using the electrophotographic member of the present invention as a charging member or a developer carrying member and including an electrophotographic photosensitive member.

According to the present invention, an electrophotographic member in which an increase in resistance in a low temperature environment around 0° C. is small and which contributes to the formation of a high quality electrophotographic image is obtained by a combination of a urethane resin having a particular structure and an ion-conductive agent having a particular anion.

In addition, according to the present invention, a process cartridge and an electrophotographic apparatus that can stably form a high quality electrophotographic image are obtained.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1A:
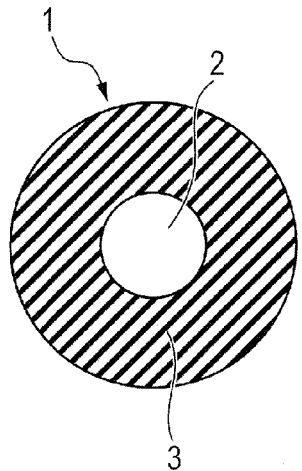
FIGS. 1A, 1B and 1C are conceptual diagrams illustrating examples of the electrophotographic member of the present invention.
Figure 1B:
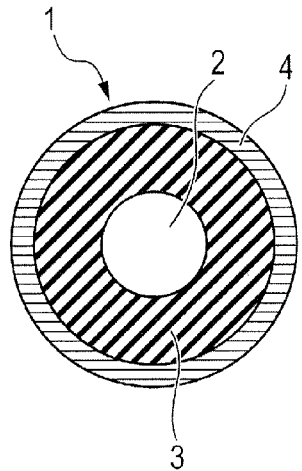
Figure 1C:
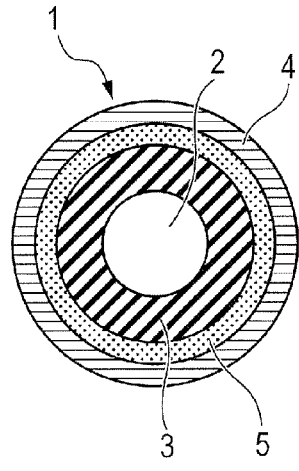

Embodiments of a case where an electrophotographic member according to the present invention is used as an electro-conductive roller are illustrated in FIGS. 1A to 1C. An electro-conductive roller 1 according to the present invention can include an electro-conductive mandrel 2 and an elastic layer 3 provided on the outer periphery of the electro-conductive mandrel 2 as illustrated in FIG. 1A. In this case, the elastic layer 3 is an electro-conductive layer including a resin according to the present invention. In addition, as illustrated in FIG. 1B, a surface layer 4 may be formed on the surface of the elastic layer 3. In this case, the electro-conductive layer according to the present invention can be applied to either of the elastic layer 3 and the surface layer 4.

Further, as illustrated in FIG. 1C, the electro-conductive roller 1 according to the present invention may be a three-layer structure in which an intermediate layer 5 is disposed between the elastic layer 3 and the surface layer 4, or a multilayer configuration in which a plurality of intermediate layers 5 are disposed. In this case, the electro-conductive layer according to the present invention can be applied to any of the elastic layer 3, the intermediate layer 5 and the surface layer 4.

<Mandrel>

The mandrel 2 is a solid cylindrical or hollow cylindrical mandrel that functions as the electrode and supporting member of the electro-conductive roller 1. The mandrel 2 includes a metal or an alloy such as aluminum, a copper alloy or stainless steel; iron plated with chromium or nickel; or an electro-conductive material such as a synthetic resin having electro-conductivity.

<Elastic Layer>

The elastic layer 3 provides to the electro-conductive roller the elasticity required to form a nip having a predetermined width in the abutting portion of the electro-conductive roller and a photosensitive member.

The elastic layer 3 can usually be formed with a molded body of a rubber material. Examples of the rubber material include the following: ethylene-propylene-diene copolymerized rubbers, acrylonitrile-butadiene rubbers, chloroprene rubbers, natural rubbers, isoprene rubbers, styrene-butadiene rubbers, fluororubbers, silicone rubbers, epichlorohydrin rubbers and urethane rubbers. These rubbers can be used alone, or two or more of these rubbers can be mixed and used. Among these rubbers, particularly silicone rubbers are preferred in terms of compression set and flexibility. Examples of the silicone rubbers include cured products of addition-curable silicone rubbers.

Examples of the method of molding the elastic layer include die molding using a liquid material, and extrusion molding using a kneaded rubber material.

Various additives such as an electro-conductivity providing agent, a non-electro-conductive filler, a crosslinking agent and a catalyst are appropriately blended in the elastic layer 3. As the electro-conductivity providing agent added to allow the elastic layer to function as the electro-conductive layer according to the present invention, fine particles of carbon black; electro-conductive metals such as aluminum and copper; and electro-conductive metal oxides such as tin oxide and titanium oxide can be used. Among these materials, carbon black is particularly preferred because the carbon black is relatively easily available and good electro-conductivity is obtained. When carbon black is used as the electro-conductivity providing agent, 2 to 50 parts by mass of carbon black is blended based on 100 parts by mass of the rubber in the rubber material. Examples of the non-electro-conductive filler include silica, quartz powders, titanium oxide or calcium carbonate. Examples of the crosslinking agent include di-t-butyl peroxide, 2,5-dimethyl-2,5-di(t-butylperoxy)hexane or dicumyl peroxide.

<Electro-Conductive Layer>

The present invention is characterized in that the electro-conductive layer includes a urethane resin and an ion-conductive agent, the urethane resin has, between two adjacent urethane bonds, a structure represented by the following structure (1) and at least one structure selected from the group consisting of a structure represented by the following structure (2) and a structure represented by the following structure (3), and the ion-conductive agent contains at least one anion selected from a fluorinated sulfonylimide anion, a fluorinated sulfonylmethide anion, a fluorinated sulfonate anion, a fluorinated carboxylate anion, a fluorinated borate anion, a fluorinated phosphate anion, a fluorinated arsenate anion, a fluorinated antimonate anion, a dicyanamide anion and a bis(oxalato)borate anion.

In other words, the urethane resin according to the present invention has in the molecule a structure in which the structure represented by the following structure (1) and either one or both structures selected from the group consisting of the structure represented by the following structure (2) and the structure represented by the following structure (3) are sandwiched between two urethane bonds.

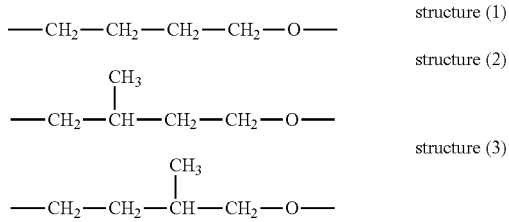

Figure 5:
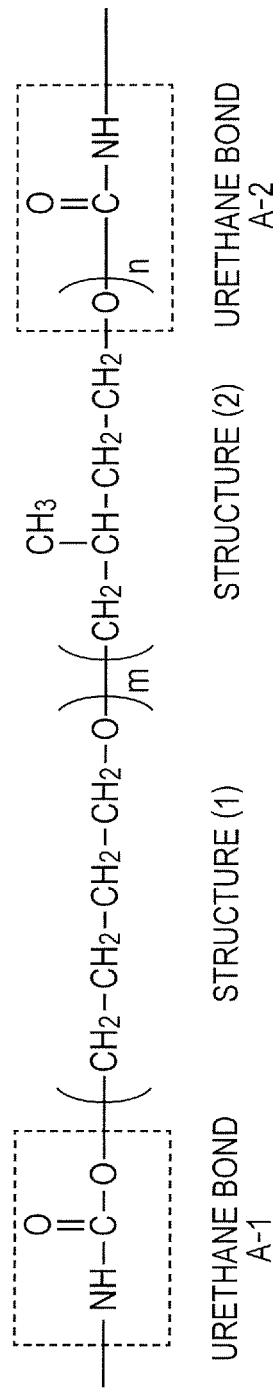
FIG. 5 is a diagram illustrating a characteristic structure that a urethane resin according to the present invention has.

One example of the characteristic structure that the urethane resin according to the present invention has is illustrated in FIG. 5. In FIG. 5, the structure represented by the above structure (1) and the structure represented by the above structure (2) are sandwiched between adjacent urethane bonds A1 and A2.

The structure (1) and the above structure (2) or (3) may be randomly disposed, and a block structure in which a segment in which only the structure (1) is polymerized and a segment in which only the above structure (2) or (3) is polymerized are disposed may be formed.

For the reason why the effect of the present invention is achieved by containing a urethane resin having the structure of the structure (1) and at least one structure selected from the structures (2) and (3), and an ion-conductive agent containing at least one anion selected from a fluorinated sulfonylimide anion, a fluorinated sulfonylmethide anion, a fluorinated sulfonate anion, a fluorinated carboxylate anion, a fluorinated borate anion, a fluorinated phosphate anion, a fluorinated arsenate anion, a fluorinated antimonate anion, a dicyanamide anion and a bis(oxalato)borate anion, the present inventors presumes as follows.

The anion according to the present invention is chemically very stable compared with a halogen anion, a sulfate anion and a nitrate anion, and the "ionization rate" in which a cation and an anion, rather than a "salt" in which a cation is ionically bonded to an anion, are formed is high.

It is presumed that this high ionization rate is derived from the chemical structure. In other words, it is considered that the anion has a strong electron withdrawing group in the molecule to stabilize the negative charge of the anion, thereby showing a high ionization rate in a wide temperature region and contributing to the development of high electro-conductivity even at low temperature.

However, the anion according to the present invention has a bulky functional group, for example, a fluoroalkyl group, in the molecule and therefore often has a large ion size. Therefore, it is considered that the mobility of the anion is likely to be affected by the binder resin.

On the other hand, as the urethane resin, high electro-conductivity is obtained when the crosslinking density is decreased and the free volume of the polymer chain is ensured in order to maintain the mobility of the ions. But, in urethane resins using polyethers or polyesters, the stacking of the polymer chains, that is, crystallization, may occur in a low temperature region. As the temperature becomes lower, and as the molecular weight becomes larger, crystallization is more likely to occur, and the free volume of the crystallized polymer chain decreases significantly, and therefore, the mobility of the carrier components of the ion-conductive agent decreases. Therefore, it is considered that resistance increase in a low temperature environment around 0° C. occurs.

By introducing a methyl group into a side chain, the urethane resin according to the present invention having the structure represented by the structure (1) and at least one structure selected from the group consisting of the structure represented by the structure (2) and the structure represented by the structure (3) present between adjacent urethane bonds is a urethane resin that is unlikely to crystallize compared with conventional urethane resins using polyethers or polyesters.

Therefore, it is presumed that when the anion according to the present invention is combined with the above-described urethane resin, crystallization is less likely to occur even in a low temperature environment around 0° C., and the free volume of the polymer chain is ensured, and therefore, even if the ion size is large, the mobility of the ion carriers does not decrease, and high electro-conductivity is obtained.

In other words, in order to achieve the effect of the present invention,
1. a urethane resin which is less likely to crystallize even at a low temperature around 0° C. and in which free volume is ensured; and 2. an anion having a strong electron withdrawing group in the molecule and having a high ionization rate even at low temperature are necessary elements. Therefore, it is considered that only with a particular combination of a urethane resin having the structure of the structure (1) and at least one structure selected from the structures (2) and (3) with the anion according to the present invention, an increase in resistance is suppressed in a low temperature environment around 0° C.

The urethane resin according to the present invention is obtained, for example, by reacting a polyether polyol having the structure of the structure (1) and at least one structure selected from the structures (2) and (3) with a polyisocyanate.

The urethane resin according to the present invention can be obtained by randomly copolymerizing the structure represented by the structure (1) and at least one structure selected from the group consisting of the structures represented by the structure (2) and the structure (3). The reason is because the crystallinity reduction effect in a low temperature region and the molecular mobility suppression effect in a high temperature region are higher.

In the urethane resin according to the present invention, "the molar ratio of the structure of the structure (1)":"the molar ratio of the at least one structure selected from the group consisting of the structures (2) and (3)" can be in the range of 90:10 to 60:40. When the molar ratio of the structures of the chemical formulas is in this range, crystallinity suppression in a low temperature region and the flexibility of the polymer chain are both achieved, and therefore, the electro-conductivity is better.

In addition, the urethane resin according to the present invention is less likely to crystallize even at low temperature, and free volume is ensured, and therefore, when the crosslinking density is decreased, particularly high electro-conductivity is obtained. As the indicator of the crosslinking density, a volume swelling ratio by a toluene immersion method is used. Specifically, the volume swelling ratio obtained by immersing the urethane resin in toluene at 25° C. for 24 hours and dividing the volume after the immersion by the volume before the immersion (hereinafter also referred to as a "toluene swelling ratio") can be particularly 20% or more and 60% or less.

When the toluene swelling ratio is 20% or more, mobility is ensured even for an anion having a large size, and therefore, higher electro-conductivity is obtained. When the toluene swelling ratio is 60% or less, the mechanical properties are excellent, and hard wear resistance and durability are obtained.

Examples of the method of setting the toluene swelling ratio to 20% or more and 60% or less using the urethane resin according to the present invention include a synthesis method using a prepolymer method.

The urethane resin according to the present invention is more preferably obtained by thermally curing one or both of the following prepolymers:

an isocyanate group-terminated prepolymer obtained by reacting a polyether polyol having the structure represented by the structure (1) and at least one structure selected from the structure represented by the structure (2) and the structure represented by the structure (3) with a polyisocyanate; and a hydroxyl group-terminated prepolymer obtained by reacting a polyether polyol having the structure represented by the structure (1) and at least one structure selected from the structure represented by the structure (2) and the structure represented by the structure (3) with a diisocyanate.

The isocyanate compounds reacted with these polyol components are not particularly limited. Aliphatic polyisocyanates such as ethylene diisocyanate and 1,6-hexamethylene diisocyanate (HDI), alicyclic polyisocyanates such as isophorone diisocyanate (IPDI), cyclohexane 1,3-diisocyanate and cyclohexane 1,4-diisocyanate, aromatic isocyanates such as 2,4-tolylene diisocyanate, 2,6-tolylene diisocyanate (TDI), 4,4'-diphenylmethane diisocyanate (MDI), polymeric diphenylmethane diisocyanate, xylylene diisocyanate and naphthalene diisocyanate, and copolymers, isocyanurates, TMP adducts and biurets thereof and blocks thereof can be used.

Among these isocyanate compounds, aromatic isocyanates such as tolylene diisocyanate, diphenylmethane diisocyanate and polymeric diphenylmethane diisocyanate are more preferably used.

For the mixing ratio of the isocyanate compound reacted with the polyol component, the ratio of isocyanate groups can be in the range of 1.1 to 1.8 with respect to 1.0 of hydroxyl groups because the remaining of unreacted components can be suppressed.

Specific examples of the cation of the ion-conductive agent include quaternary ammonium groups, sulfonium groups, phosphonium groups and nitrogen-containing heterocyclic groups. Examples of nitrogen-containing heterocyclic groups include a piperidinium group, pyrrolidinium group, a morpholinium group, an oxazolium group, a pyridinium group, a pyrimidinium group, a pyrazinium group, a pyridazinium group, an imidazolium group, a pyrazolium group, a triazolium group and hydrides and derivatives thereof.

As the synthesis method for the ion-conductive agent, for example, a tertiary amino compound or a nitrogen-containing heterocyclic compound, can be subjected to a known quaternization reaction, for example, a quaternization reaction using an alkyl halide, to form a quaternary ammonium group.

The present invention is characterized in that the ion-conductive agent contains, as the anion paired with the cation, at least one anion selected from a fluorinated sulfonylimide anion, a fluorinated sulfonylmethide anion, a fluorinated sulfonate anion, a fluorinated carboxylate anion, a fluorinated borate anion, a fluorinated phosphate anion, a fluorinated arsenate anion, a fluorinated antimonate anion, a dicyanamide anion and a bis(oxalato)borate anion.

Examples of the fluorinated sulfonylimide anion include cyclic anions such as a trifluoromethanesulfonylimide anion, a perfluoroethylsulfonylimide anion, a perfluoropropylsulfonylimide anion, a perfluorobutylsulfonylimide anion, a perfluoropentylsulfonylimide anion, a perfluorohexylsulfonylimide anion, a perfluorooctylsulfonylimide anion, a fluorosulfonylimide anion or cyclo-hexafluoropropane-1,3-bis(sulfonyl)imide.

Examples of the fluorinated sulfonylmethide anion include a trifluoromethanesulfonylmethide anion, a perfluoroethylsulfonylmethide anion, a perfluoropropylsulfonylmethide anion, a perfluorobutylsulfonylmethide anion, a perfluoropentylsulfonylmethide anion, a perfluorohexylsulfonylmethide anion and a perfluorooctylsulfonylmethide anion.

Examples of the fluorinated sulfonate anion include trifluoromethanesulfonate anion, a fluoromethanesulfonate anion, a perfluoroethylsulfonate anion, a perfluoropropylsulfonate anion, a perfluorobutylsulfonate anion, a perfluoropentylsulfonate anion, a perfluorohexylsulfonate anion and a perfluorooctylsulfonate anion.

Examples of the fluorinated carboxylate anion include a trifluoroacetate anion, a perfluoropropionate anion, a perfluorobutyrate anion, a perfluorovalerate anion and a perfluorocaproate anion.

Examples of the fluorinated borate anion include a trifluoroborate anion, a trifluoromethyltrifluoroborate anion and a perfluoroethyltrifluoroborate anion.

Examples of the fluorinated phosphate anion include a hexafluorophosphate anion, a tris-trifluoromethyl-trifluorophosphate anion and a tris-perfluoroethyl-trifluorophosphate anion.

Examples of the fluorinated arsenate anion include a hexafluoroarsenate anion and a trifluoromethyl-pentafluoroarsenate anion.

Examples of the fluorinated antimonate anion include a hexafluoroantimonate anion and a trifluoromethyl-pentafluoroantimonate anion.

Examples of other anions include a dicyanamide anion and a bis(oxalato)borate anion.

The ion-conductive agent according to the present invention can be obtained, for example, by the ion exchange reaction of the desired cation using an alkali metal salt of the above anion.

The cation of the ion-conductive agent can be chemically bonded to the urethane resin.

When the cation is chemically bonded to the urethane resin, the cation component decreases crystallinity at low temperature like the methyl group in the side chain contained in the structures (2) and (3), and therefore, further, the electro-conductivity at low temperature is excellent.

Examples of the method of chemically bonding the cation of the ion-conductive agent to the urethane resin include a method of introducing a reactive functional group into the cation of the ion-conductive agent for reaction with the isocyanate and the urethane resin. Examples of the reactive functional group introduced into the cation include a hydroxyl group, an amino group, a glycidyl group, and a carboxyl group.

Further, the cation of the ion-conductive agent can particularly have a plurality of chemical bonds to the urethane resin.

Specifically, for example, when a reactive functional group is introduced into the cation of the ion-conductive agent, the ion-conductive agent can particularly have two or more reactive functional groups with respect to one molecule of the cation because the electro-conductivity at low temperature is better.

The content of the ion-conductive agent can be 1 part by mass or more and 10 parts by mass or less based on 100 parts by mass of the urethane resin in terms of electro-conductivity and bleed suppression.

When the electro-conductive layer according to the present invention is used as the surface layer 4, a non-electro-conductive filler such as silica, a quartz powder, titanium oxide, zinc oxide or calcium carbonate may be contained as required. When a method of coating with a paint is adopted in the formation of the surface layer, a non-electro-conductive filler can be added to form a film-forming aid. The content of the non-electro-conductive filler can be 10% by mass or more and 30% by mass or less based on 100 parts by mass of the resin components forming the surface layer, that is, the combined components of the binder resin and the resin having the structure represented by the structure (1).

In addition, the surface layer 4 may contain an electro-conductive filler as required to the extent that the effect of the present invention is not hindered. As the electro-conductive filler, fine particles of carbon black; electro-conductive metals such as aluminum and copper; and electro-conductive metal oxides such as zinc oxide, tin oxide and titanium oxide can be used. Among these materials, carbon black is particularly preferred because the carbon black is relatively easily available and in terms of electro-conductivity providing properties and reinforcement properties.

When surface roughness is required as a developer carrying member or a charging member, fine particles for roughness control may be added to the surface layer 4. The fine particles for roughness control can have a volume average particle diameter of 3 to 20 µm. In addition, the amount of particles added to the surface layer 4 can be 1 to 50 parts by mass based on 100 parts by mass of the resin solids of the surface layer 4. For the fine particles for roughness control, fine particles of polyurethane resins, polyester resins, polyether resins, polyamide resins, acrylic resins and phenolic resin can be used.

The method of forming the surface layer 4 is not particularly limited. Examples of the method include spraying, immersion or roll coating with a paint. An immersion coating method in which a paint is allowed to overflow from the upper end of an immersion vessel as described in Japanese Patent Application Laid-Open No. 557-5047 is simple as the method of forming the surface layer and excellent in production stability.

The electrophotographic member of the present invention can be applied to any of noncontact type developing apparatuses and contact type developing apparatuses using magnetic one-component developers or nonmagnetic one-component developers, developing apparatuses using two-component developers, and the like.

Figure 2:
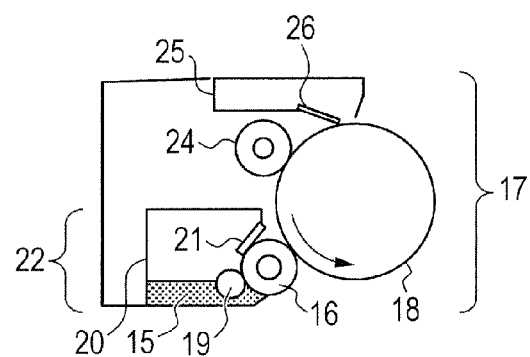
FIG. 2 is a schematic configuration diagram illustrating one example of the process cartridge of the present invention.

FIG. 2 is a cross-sectional view illustrating one example of a process cartridge according to the present invention. A process cartridge 17 illustrated in FIG. 2 is formed by integrating a developing roller 16, a developing blade 21, a developing apparatus 22, an electrophotographic photosensitive member 18, a cleaning blade 26, a waste toner containing container 25 and a charging roller 24, and removably arranged in the main body of an electrophotographic image forming apparatus. The developing apparatus 22 includes a toner container 20, and the toner container 20 is filled with toner 15. The toner 15 in the toner container 20 is supplied to the surface of the developing roller 16 by a toner supply roller 19, and a layer of the toner 15 having a predetermined thickness is formed on the surface of the developing roller 16 by the developing blade 21.

Figure 3:
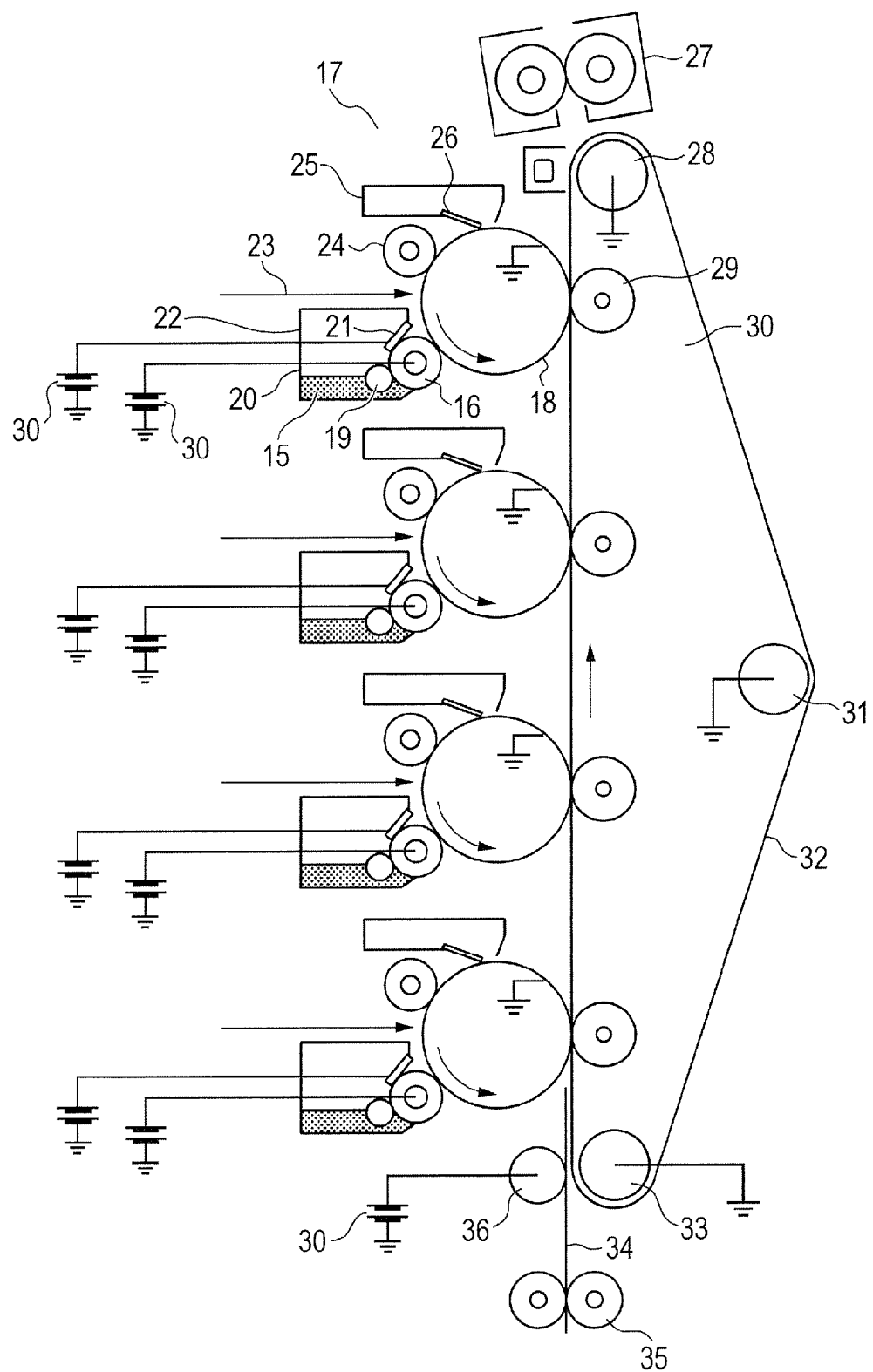
FIG. 3 is a schematic configuration diagram illustrating one example of the electrophotographic apparatus of the present invention.

FIG. 3 is a cross-sectional view illustrating one example of an electrophotographic apparatus using the electrophotographic member according to the present invention as a developer carrying member. A developing apparatus 22 including a developing roller 16 (developer carrying member), a toner supply roller 19, a toner container 20 and a developing blade 21 is removably mounted in the electrophotographic apparatus in FIG. 3. In addition, a process cartridge 17 including a photosensitive member 18, a cleaning blade 26, a waste toner containing container 25 and a charging roller 24 is removably mounted. In addition, the photosensitive member 18, the cleaning blade 26, the waste toner containing container 25 and the charging roller 24 may be disposed in the main body of the electrophotographic apparatus. The photosensitive member 18 rotates in the direction of the arrow and is uniformly charged by the charging roller 24 for charging the photosensitive member 18, and an electrostatic latent image is formed on the surface of the photosensitive member 18 by laser light 23, which is an exposure measure for writing an electrostatic latent image on the photosensitive member 18. The above electrostatic latent image is developed by being provided with toner 15 by the developing apparatus 22 disposed in contact with the photosensitive member 18, and visualized as a toner image.

For the development, the so-called reversal development in which a toner image is formed in an exposed portion is performed. The visualized toner image on the photosensitive member 18 is transferred to paper 34, which is a recording medium, by a transfer roller 29, which is a transfer member. The paper 34 is fed into the apparatus via a paper feed roller 35 and an adsorption roller 36, and conveyed between the photosensitive member 18 and the transfer roller 29 by an endless belt-like transfer and conveyance belt 32. The transfer and conveyance belt 32 is operated by a driven roller 33, a driving roller 28 and a tension roller 31. Voltage is applied to the transfer roller 29 and the adsorption roller 36 from bias supplies 30. The paper 34 to which the toner image is transferred is subjected to fixing treatment by a fixing apparatus 27 and ejected out of the apparatus, and the printing operation is completed.

On the other hand, transfer residual toner that is not transferred and remains on the photosensitive member 18 is scraped off by the cleaning blade 26, which is a cleaning member for cleaning the photosensitive member surface, and housed in the waste toner containing container 25, and the cleaned photosensitive member 18 repeats the above-described action.

The developing apparatus 22 includes the toner container 20 containing the toner 15, and the developing roller 16 as a developer carrying member positioned in the opening extending in the longitudinal direction in the toner container 20 and installed opposed to the photosensitive member 18. This developing apparatus 22 is adapted to develop and visualize the electrostatic latent image on the photosensitive member 18.

Specific Examples and Comparative Examples according to the present invention will be shown below.

<Synthesis of Ionic Compounds>

The ion-conductive agent having the anion according to the present invention can be synthesized by a known measure, for example, by quaternizing an amino compound or a nitrogen-containing heterocyclic compound with an alkyl halide and performing an ion exchange reaction using a salt having the desired anion. Examples of the synthesis method will be shown below.

(Synthesis of Ionic Compound IP-1)

50.0 g of bis(2-hydroxyethyl)dimethylammonium chloride (manufactured by Acros Organics) was dissolved in 90.0 g of ion exchange water. Next, 93.1 g of an anion exchange reagent, lithium bis(trifluoromethanesulfonyl)imide (trade name, EF-N115; manufactured by Mitsubishi Materials Electronic Chemicals Co., Ltd.), dissolved in 100 g of ion exchange water was dropped into this solution over 30 minutes, and the solution was stirred at 30° C. for 6 hours. Next, the solution after the stirring was subjected to an extraction operation twice using 300.0 g of ethyl acetate. Next, the separated ethyl acetate layer was subjected to a washing operation three times using 120 g of ion exchange water. Then, the ethyl acetate was distilled off under reduced pressure to obtain an ionic compound IP-1 in which the anion was a bis(trifluoromethanesulfonyl)imide anion.

(Synthesis of Ionic Compounds IP-2 to IP-7)

Ionic compounds IP-2, 3, 4, 5, 6 and 7 were obtained as in the synthesis example of the synthesis of the ionic compound IP-1 except that the anion exchange reagent and the amount blended were changed as described in Table 1.

of sodium carbonate was added. The solution was stirred for 30 minutes and then separated. The benzene layer was subjected to a washing operation twice using 120 g of ion exchange water. Next, the benzene was distilled off under reduced pressure to obtain a residue.

Then, the obtained residue was dissolved in 70.0 g of acetonitrile. 67.3 g of 1-bromobutane (manufactured by KISHIDA CHEMICAL Co., Ltd.) was added to this solution at room temperature, and then, the solution was heated to reflux at 90° C. for 12 hours. Next, the solution after being heated to reflux was cooled to room temperature, and the acetonitrile was distilled off under reduced pressure. The obtained concentrate was washed with 30.0 g of diethyl ether, and the supernatant liquid was removed by separation. The washing and separation operations were repeated three times to obtain a residue.

Further, the obtained residue was dissolved in 110.0 g of dichloromethane. 76.5 g of an anion exchange reagent, lithium trifluoromethanesulfonate (trade name, EF-15; manufactured by Mitsubishi Materials Electronic Chemicals Co., Ltd.), dissolved in 80.0 g of ion exchange water was dropped into this solution over 30 minutes, and the solution was stirred at 30° C. for 12 hours. The obtained solution was separated, and the organic layer was subjected to a washing

TABLE 1

| | Cation raw material | | Anion exchange reagent | |
|---|---|---|---|---|
| No. | Product name | Weight (g) | Product name | Weight (g) |
| IP-1 | Bis(2-hydroxyethyl) dimethylammonium chloride (manufactured by Acros Organics) | 50.0 | Lithium N,N-bis(trifluoromethanesulfonyl)imide (trade name EF-N115; manufactured by Mitsubishi Materials Electronic Chemicals Co., Ltd.) | 93.1 |
| IP-2 | | | Potassium N,N-bis(fluorosulfonyl)imide (trade name K-FSI; manufactured by Mitsubishi Materials Electronic Chemicals Co., Ltd.) | 71.1 |
| IP-3 | | | Lithium bis(pentafluoroethanesulfonyl)imide (manufactured by KISHIDA CHEMICAL Co., Ltd.) | 125.6 |
| IP-4 | | | Potassium N,N-hexafluoropropane-1,3-disulfonylimide (trade name EF-N302; manufactured by Mitsubishi Materials Electronic Chemicals Co., Ltd.) | 107.4 |
| IP-5 | | | Lithium trifluoroacetate (manufactured by Wako Pure Chemical Industries, Ltd.) | 38.9 |
| IP-6 | | | Sodium heptafluorobutyrate (manufactured by Wako Pure Chemical Industries, Ltd.) | 76.6 |
| IP-7 | | | Potassium tris(trifluoromethanesulfonyl)methide (trade name: K-TFSM; manufactured by Central Glass Co., Ltd.) | 146.0 |

(Synthesis of Ionic Compound IP-8)

50.0 g of 4-hydroxyethylimidazole (manufactured by The Nippon Synthetic Chemical Industry Co., Ltd.) was dissolved in 80.0 g of benzene. 75.1 g of 4-bromo-1-butanol (manufactured by TOKYO CHEMICAL INDUSTRY CO., LTD.) dissolved in 120.0 g of benzene was dropped into this solution at room temperature over 30 minutes, and the solution was heated to reflux at 85° C. for 15 hours. Next, the solution after being heated to reflux was cooled to room temperature, and 200 ml of a 5% by mass aqueous solution operation three times using 80.0 g of ion exchange water. Then, the dichloromethane was distilled off under reduced pressure to obtain an ionic compound IP-8 in which the anion was a trifluoromethanesulfonate anion.

(Synthesis of Ionic Compounds IP-9 to 13)

Ionic compounds IP-9, 10, 11, 12 and 13 were obtained as in the synthesis example of the synthesis of the ionic compound IP-8 except that the anion exchange reagent and the amount blended were changed as described in Table 2.

TABLE 2

| | Cation raw material | | Tertiarizing agent | | Quaternizing agent | | Anion exchange reagent | |
|---|---|---|---|---|---|---|---|---|
| No. | Product name | Weight (g) | Product name | Weight (g) | Product name | Weight (g) | Product name | Weight (g) |
| IP-8 | 4-Hydroxyethyl- imidazole (manufactured | 50.0 | 4-Bromo-1-butanol (manufactured by TOKYO | 75.1 | 1-Bromobutane (manufactured by KISHIDA | 67.3 | Lithium trifluoromethanesulfonate (trade name EF-15; manufactured by Mitsubishi Materials Electronic Chemicals Co., Ltd.) | 76.5 |

TABLE 2-continued

| | Cation raw material | | Tertiarizing agent | | Quaternizing agent | | Anion exchange reagent | |
|---|---|---|---|---|---|---|---|---|
| No. | Product name | Weight (g) | Product name | Weight (g) | Product name | Weight (g) | Product name | Weight (g) |
| IP-9 | by The Nippon Synthetic Chemical Industry Co., Ltd.) | | CHEMICAL INDUSTRY CO., LTD.) | | CHEMICAL Co., Ltd.) | | Potassium nonafluorobutanesulfonate (trade name KFBS; manufactured by Mitsubishi Materials Electronic Chemicals Co., Ltd.) | 165.8 |
| IP-10 | | | | | | | Lithium tetrafluoroborate (manufactured by TOKYO CHEMICAL INDUSTRY CO., LTD.) | 46.1 |
| IP-11 | | | | | | | Lithium hexafluorophosphate (manufactured by Wako Pure Chemical Industries, Ltd.) | 74.6 |
| IP-12 | | | | | | | Potassium hexafluoroarsenate (manufactured by TOKYO CHEMICAL INDUSTRY CO., LTD.) | 111.9 |
| IP-13 | | | | | | | Lithium hexafluoroantimonate (manufactured by Wako Pure Chemical Industries, Ltd.) | 119.2 |

(Synthesis of Ionic Compound IP-14)

50.0 g of 4-(2-hydroxyethyl)pyridine (manufactured by TOKYO CHEMICAL INDUSTRY CO., LTD.) was dissolved in 70.0 g of acetonitrile. 55.9 g of 2-bromoethanol (manufactured by TOKYO CHEMICAL INDUSTRY CO., LTD.) was added to this solution at room temperature, and then, the solution was heated to reflux at 90° C. for 12 hours. Next, the solution after being heated to reflux was cooled to room temperature, and the acetonitrile was distilled off under reduced pressure. The obtained concentrate was washed with 30.0 g of diethyl ether, and the supernatant liquid was removed by separation. The washing and separation operations were repeated three times to obtain a residue.

Further, the obtained residue was dissolved in 110.0 g of dichloromethane. 39.8 g of an anion exchange reagent, sodium dicyanamide (manufactured by TOKYO CHEMICAL INDUSTRY CO., LTD.), dissolved in 40.0 g of ion exchange water was dropped into this solution over 30 minutes, and the solution was stirred at 30° C. for 12 hours. The obtained solution was separated, and the organic layer was subjected to a washing operation three times using 80.0 g of ion exchange water. Then, the dichloromethane was distilled off under reduced pressure to obtain an ionic compound IP-14 in which the anion was a dicyanamide anion.

(Synthesis of Ionic Compound IP-15)

An ionic compound IP-15 was obtained as in the synthesis example of the synthesis of the ionic compound IP-14 except that the anion exchange reagent and the amount blended were changed as described in Table 3.

TABLE 3

| | Cation raw material | | Quaternizing agent | | Anion exchange reagent | |
|---|---|---|---|---|---|---|
| No. | Product name | Weight (g) | Product name | Weight (g) | Product name | Weight (g) |
| IP-14 | 4-(2-Hydroxyethyl)pyridine (manufactured by TOKYO CHEMICAL INDUSTRY CO., LTD.) | 50.0 | 2-Bromoethanol (manufactured by TOKYO CHEMICAL INDUSTRY CO., LTD.) | 55.9 | Sodium dicyanamide (manufactured by TOKYO CHEMICAL INDUSTRY CO., LTD.) | 39.8 |
| IP-15 | | | | | Lithium bis(oxalato)borate (trade name: LiBOB; manufactured by BOC Sciences) | 86.7 |
| IP-16 | 1-(4-Hydroxybutyl)imidazole (manufactured by Creenchem Institute) | | Iodoethane (manufactured by KISHIDA CHEMICAL Co., Ltd.) | 61.3 | Lithium trifluoromethanesulfonate (trade name EF-15; manufactured by Mitsubishi Materials Electronic Chemicals Co., Ltd.) | 61.3 |
| IP-17 | Triethanolamine (manufactured by TOKYO CHEMICAL INDUSTRY CO., LTD.) | | Iodoethane (manufactured by KISHIDA CHEMICAL Co., Ltd.) | 57.6 | Lithium N,N-bis(trifluoromethanesulfonyl)imide (trade name EF-N115; manufactured by Mitsubishi Materials Electronic Chemicals Co., Ltd.) | 105.9 |
| IP-18 | 4-Hydroxyethylimidazole (manufactured by The Nippon Synthetic Chemical Industry Co., Ltd.) | | 2-Bromoethanol (manufactured by TOKYO CHEMICAL INDUSTRY CO., LTD.) | 122.8 | Lithium trifluoromethanesulfonate (trade name EF-15; manufactured by Mitsubishi Materials Electronic Chemicals Co., Ltd.) | 76.6 |

(Synthesis of Ionic Compound IP-16)

50.0 g of 1-(4-hydroxybutyl)imidazole (manufactured by Creenchem Institute) was dissolved in 70.0 g of acetonitrile. 61.3 g of iodoethane (manufactured by KISHIDA CHEMICAL Co., Ltd.) was added to this solution at room temperature, and then, the solution was heated to reflux at 90° C. for 12 hours. Next, the solution after being heated to reflux was cooled to room temperature, and the acetonitrile was distilled off under reduced pressure. The obtained concentrate was washed with 30.0 g of diethyl ether, and the supernatant liquid was removed by separation. The washing and separation operations were repeated three times to obtain a residue.

Further, the obtained residue was dissolved in 110.0 g of dichloromethane. 61.3 g of an anion exchange reagent, lithium trifluoromethanesulfonate (trade name, EF-15; manufactured by Mitsubishi Materials Electronic Chemicals Co., Ltd.), dissolved in 60.0 g of ion exchange water was dropped into this solution over 30 minutes, and the solution was stirred at 30° C. for 12 hours. The obtained solution was separated, and the organic layer was subjected to a washing operation three times using 60.0 g of ion exchange water. Then, the dichloromethane was distilled off under reduced pressure to obtain an ionic compound IP-16 in which the anion was a trifluoromethanesulfonate anion.

(Synthesis of Ionic Compound IP-17)

50.0 g of triethanolamine (manufactured by TOKYO CHEMICAL INDUSTRY CO., LTD.) was dissolved in 70.0 g of acetonitrile. 57.6 g of iodoethane (manufactured by KISHIDA CHEMICAL Co., Ltd.) was added to this solution at room temperature, and then, the solution was heated to reflux at 90° C. for 12 hours. Next, the solution after being heated to reflux was cooled to room temperature, and the acetonitrile was distilled off under reduced pressure. The obtained concentrate was washed with 30.0 g of diethyl ether, and the supernatant liquid was removed by separation. The washing and separation operations were repeated three times to obtain a residue.

Further, the obtained residue was dissolved in 110.0 g of dichloromethane. 105.9 g of an anion exchange reagent, lithium bis(trifluoromethanesulfonyl)imide (trade name, EF-N115; manufactured by Mitsubishi Materials Electronic Chemicals Co., Ltd.), dissolved in 100.0 g of ion exchange water was dropped into this solution over 30 minutes, and the solution was stirred at 30° C. for 12 hours. The solution after the stirring was separated, and the organic layer was subjected to a washing operation three times using 60.0 g of ion exchange water. Then, the dichloromethane was distilled off under reduced pressure to obtain an ionic compound IP-17 in which the anion was a bis(trifluoromethanesulfonyl)imide anion.

(Synthesis of Ionic Compound IP-18)

50.0 g of 4-hydroxyethylimidazole (manufactured by The Nippon Synthetic Chemical Industry Co., Ltd.) was dissolved in 70.0 g of acetonitrile. 122.8 g of 2-bromoethanol (manufactured by TOKYO CHEMICAL INDUSTRY CO., LTD.) was added to this solution at room temperature, and then, the solution was heated to reflux at 90° C. for 12 hours. Next, the solution after being heated to reflux was cooled to room temperature, and the acetonitrile was distilled off under reduced pressure. The obtained concentrate was washed with 30.0 g of diethyl ether, and the supernatant liquid was removed by separation. The washing and separation operations were repeated three times to obtain a residue.

Further, the obtained residue was dissolved in 110.0 g of dichloromethane. 76.6 g of an anion exchange reagent, lithium trifluoromethanesulfonate (trade name, EF-15; manufactured by Mitsubishi Materials Electronic Chemicals Co., Ltd.), dissolved in 100.0 g of ion exchange water was dropped into this solution over 30 minutes, and the solution was stirred at 30° C. for 12 hours. The solution after the stirring was separated, and the organic layer was subjected to a washing operation three times using 60.0 g of ion exchange water. Then, the dichloromethane was distilled off under reduced pressure to obtain an ionic compound IP-18 in which the anion was a trifluoromethanesulfonate anion.

Compounds used as the obtained ionic compounds IP-1 to IP-18 and ionic compounds IP-19 to IP-24 are shown in Table 4.

TABLE 4

| No. | Number of OH groups | Cation | Anion | Remarks |
|---|---|---|---|---|
| IP-1 | 2 | Bis(2-hydroxyethyl) dimethylammonium | $(CF_3SO_2)_2N^-$ | |
| IP-2 | | | $(FSO_2)_2N^-$ | |
| IP-3 | | | $(CF_3CF_2SO_2)_2N^-$ | |
| IP-4 | | | $(SO_2C_3F_6SO_2)N^-$ | |
| IP-5 | | | $CF_3COO^-$ | |
| IP-6 | | | $CF_3CF_2CF_2COO^-$ | |
| IP-7 | | | $(CF_3SO_2)_3C^-$ | |
| IP-8 | 2 | 1,4-Di-(2-hydroxyethyl)-3-n-butylimidazolium | $CF_3SO_3^-$ | |
| IP-9 | | | $CF_3CF_2CF_2CF_2SO_3^-$ | |
| IP-10 | | | $BF_4^-$ | |
| IP-11 | | | $PF_6^-$ | |
| IP-12 | | | $AsF_6^-$ | |
| IP-13 | | | $SbF_6^-$ | |
| IP-14 | 2 | 1,4-Di-(2-hydroxyethyl)pyridinium | $(CN_2)N^-$ | |
| IP-15 | | | $(C_2O_4)_2B^-$ | |
| IP-16 | 1 | 1-(4-Hydroxybutyl)-3-ethylimidazolium | $CF_3SO_3^-$ | |
| IP-17 | 3 | Tris(2-hydroxyethyl)ethylammonium | $(CF_3SO_2)_2N^-$ | |
| IP-18 | 3 | 1,3,4-Tri(2-hydroxyethyl)imidazolium | $CF_3SO_3^-$ | |
| IP-19 | 0 | Tributylmethylammonium | $(CF_3SO_2)_2N^-$ | Manufactured by TOKYO CHEMICAL INDUSTRY CO., LTD. |
| IP-20 | 0 | 1-Butyl-3-methylimidazolium | $CF_3SO_3^-$ | Manufactured by Sigma-Aldrich |
| IP-21 | 1 | 2-Hydroxyethyltrimethylammonium | $(CF_3SO_2)_2N^-$ | Manufactured by KANTO CHEMICAL CO., INC. |
| IP-22 | 0 | Tetra-n-butylammonium | $ClO_4^-$ | Manufactured by KANTO CHEMICAL CO., INC. |

TABLE 4-continued

| No. | Number of OH groups | Cation | Anion | Remarks |
|---|---|---|---|---|
| IP-23 | 0 | 1-Hexylpyridinium | Cl⁻ | Manufactured by KANTO CHEMICAL CO., INC. |
| IP-24 | 0 | 1-Ethyl-3-methylimidazolium | $NO_3^-$ | Manufactured by KANTO CHEMICAL CO., INC. |

(Preparation of Mandrel 2)

As a mandrel 2, a mandrel obtained by applying a primer (trade name: DY35-051; manufactured by Dow Corning Toray Co., Ltd.) to a core metal made of SUS304 and having a diameter of 6 mm, and baking the primer was prepared.

(Making of Elastic Rollers)

<Fabrication of Silicone Rubber Elastic Roller>

The mandrel 2 prepared above was disposed in a mold, and an addition type silicone rubber composition obtained by mixing the following materials was injected into the cavity formed in the mold.

Liquid silicone rubber material (trade name: SE6724A/B; manufactured by Dow Corning Toray Co., Ltd.) 100.0 parts by mass Carbon black (trade name: TOKABLACK #4300; manufactured by Tokai Carbon Co., Ltd.) 15.0 parts by mass Platinum catalyst 0.1 parts by mass Then, the mold was heated to vulcanize and cure the silicone rubber at a temperature of 150° C. for 15 minutes. The mandrel on the peripheral surface of which the cured silicone rubber layer was formed was demolded from the mold, and then, the core metal was further heated at a temperature of 180° C. for 1 hour to complete the curing reaction of the silicone rubber layer. Thus, an elastic roller D-1 in which a silicone rubber elastic layer having a diameter of 12 mm was formed on the outer periphery of the mandrel 2 was made.

<Fabrication of NBR Rubber Elastic Roller>

Materials of the types and amounts shown below were mixed by a pressure kneader to obtain an A-kneaded rubber composition.

NBR rubber (trade name: Nipol DN219; manufactured by ZEON Corporation) 100.0 parts by mass Carbon black (trade name: TOKABLACK #4300; manufactured by Tokai Carbon Co., Ltd.) 40.0 parts by mass Calcium carbonate (trade name: NANOX#30; manufactured by Maruo Calcium Co., Ltd.) 20.0 parts by mass Stearic acid (trade name: Stearic Acid S; manufactured by Kao Corporation) 1.0 part by mass Further, 166.0 parts by mass of the above A-kneaded rubber composition and materials of the types and amounts shown below were mixed by an open roll to prepare an unvulcanized rubber composition.

Sulfur (trade name: Sulfax 200S; manufactured by Tsurumi Chemical Industry Co., Ltd.) 1.2 parts by mass Tetrabenzylthiuram disulfide (trade name: TBZTD; manufactured by SANSHIN CHEMICAL INDUSTRY CO., LTD.) 4.5 parts by mass Next, a crosshead extruder having a mechanism for supplying an electro-conductive mandrel and a mechanism for discharging an unvulcanized rubber was provided, and a die having an inner diameter of 16.5 mm was attached to the crosshead. The extruder and the crosshead were adjusted to 80° C., and the conveyance speed of an electro-conductive mandrel was adjusted to 60 mm/sec. Under these conditions, the unvulcanized rubber composition was supplied from the extruder to cover an electro-conductive mandrel (the above mandrel 2) with the unvulcanized rubber composition as an elastic layer in the crosshead to obtain an unvulcanized rubber roller. Next, the above unvulcanized rubber roller was introduced into a hot air vulcanization furnace at 170° C. and heated for 60 minutes to obtain an unpolished electro-conductive roller. Then, the ends of the elastic layer were cut off and removed, and the surface of the elastic layer was polished by a grindstone. Thus, an elastic roller D-2 in which the diameters at positions 90 mm from the central portion to the both end sides were each 8.4 mm, and the central portion diameter was 8.5 mm was fabricated.

(The Preparation of a Surface Layer 4)

Synthesis examples for obtaining polyurethane surface layers according to the present invention will be shown below.

<Measurement of Molecular Weight of Copolymer>

The apparatuses and conditions used for the measurement of number average molecular weight (Mn) and weight average molecular weight (Mw) in these Examples are as follows.

Measuring equipment: HLC-8120GPC (manufactured by Tosoh Corporation)

Column: TSKgel SuperHZMM (manufactured by Tosoh Corporation)×2

Solvent: THF (20 mmol/L triethylamine is added)

Temperature: 40° C.

Flow velocity of THF: 0.6 ml/min

The measurement sample was a 0.1% by mass THF solution. Further, measurement was performed using an RI (refractive index) detector as a detector.

A calibration curve was made using TSK standard polystyrenes A-1000, A-2500, A-5000, F-1, F-2, F-4, F-10, F-20, F-40, F-80 and F-128 (manufactured by Tosoh Corporation) as standard specimens for making a calibration curve. The weight average molecular weight was obtained from the retention time of the measurement sample obtained, based on the calibration curve.

<Synthesis of Polyols>

(Synthesis of Polyether Polyol A-1)

A mixture of 216.3 g (3 mol) of dry tetrahydrofuran and 172.2 g (2 mol) of dry 3-methyltetrahydrofuran (molar mixing ratio 60/40) was maintained at a temperature of 15° C. in a reaction container. 16.4 g of 70% perchloric acid and 120 g of acetic anhydride were added to this mixture, and the reaction was performed for 2 hours. Next, the obtained reaction mixture was poured into 600 g of a 20% aqueous solution of sodium hydroxide for purification. Further, the remaining water and solvent components were removed under reduced pressure to obtain a polyether polyol A-1 having the structure represented by the structure (1) and the structure represented by the structure (2) or the structure (3). The number average molecular weight of the polyether polyol A-1 was 1200.

(Synthesis of Polyether Polyol A-2)

A mixture of 288.4 g (4 mol) of dry tetrahydrofuran and 86.1 g (1 mol) of dry 3-methyltetrahydrofuran (molar mixing ratio 80/20) was maintained at a temperature of 15° C. in a reaction container. 16.4 g of 70% perchloric acid and 120 g of acetic anhydride were added to this mixture, and the reaction was performed for 5 hours. Next, the obtained reaction mixture was poured into 600 g of a 20% aqueous solution of sodium hydroxide for purification. Further, the remaining water and solvent components were removed under reduced pressure to obtain a polyether polyol A-2 having the structure represented by the structure (1) and the structure represented by the structure (2) or the structure (3). The number average molecular weight of the polyether polyol A-2 was 3700.

(Synthesis of Hydroxyl Group-Terminated Urethane Prepolymer A-3)

100.0 g of polytetramethylene glycol (trade name: PTG-850, manufactured by Hodogaya Chemical Co., Ltd.) was gradually dropped into 122.0 parts by mass of methyl ethyl ketone (MEK) and 23.7 parts by mass of diphenylmethane diisocyanate (trade name: COSMONATE MDI, manufactured by Mitsui Chemicals, Inc.) in a reaction container under a nitrogen atmosphere while the temperature in the reaction container was maintained at 60° C. After the completion of the dropping, the mixture was reacted at a temperature of 80° C. for 3 hours. The obtained reaction product was cooled to room temperature (25° C.), and then, the MEK was distilled off under reduced pressure to obtain a hydroxyl group-terminated urethane prepolymer A-3 having the structure represented by the structure (1). The number average molecular weight of the hydroxyl group-terminated urethane prepolymer A-3 was 5500.

<Synthesis of Isocyanate Group-Terminated Prepolymers>

(Synthesis of Isocyanate Group-Terminated Prepolymer B-1)

100.0 Parts by mass of the polyol A-1 was gradually dropped into 86.6 parts by mass of polymeric MDI (trade name: MILLIONATE MR-200; manufactured by NIPPON POLYURETHANE INDUSTRY CO., LTD.) in a reaction container under a nitrogen atmosphere while the temperature in the reaction container was maintained at 65° C. After the completion of the dropping, the mixture was reacted at a temperature of 65° C. for 1.5 hours, and 80.0 parts by mass of methyl ethyl ketone was added. The obtained reaction mixture was cooled to room temperature to obtain an isocyanate group-terminated urethane prepolymer B-1 having the structure represented by the structure (1) and the structure represented by the structure (2) or the structure (3) having an isocyanate group content of 5.4% by mass.

(Synthesis of Isocyanate Group-Terminated Prepolymer B-2)

100.0 Parts by mass of the polyol A-2 was gradually dropped into 24.7 parts by mass of polymeric MDI (trade name: MILLIONATE MR-200; manufactured by NIPPON POLYURETHANE INDUSTRY CO., LTD.) in a reaction container under a nitrogen atmosphere while the temperature in the reaction container was maintained at 65° C. After the completion of the dropping, the mixture was reacted at a temperature of 65° C. for 1.5 hours, and 53.5 parts by mass of methyl ethyl ketone was added. The obtained reaction mixture was cooled to room temperature to obtain an isocyanate group-terminated urethane prepolymer B-2 having the structure represented by the structure (1) and the structure represented by the structure (2) or the structure (3) having an isocyanate group content of 4.3% by mass.

Example 1

A manufacturing method for an electrophotographic member of the present invention will be described below.

As materials for a surface layer 4, 71.9 parts by mass of the polyether polyol A-1, 28.1 parts by mass of a polymeric isocyanate (trade name: MILLIONATE MR-400; manufactured by NIPPON POLYURETHANE INDUSTRY CO., LTD.), 5.0 parts by mass of the ionic compound IP-1, 10.0 parts by mass of silica (trade name: AEROSIL 200; manufactured by NIPPON AEROSIL CO., LTD.) and 10.0 parts by mass of urethane resin fine particles (trade name: Art Pearl C-800; manufactured by Negami chemical industrial Co., Ltd) were stirred and mixed.

Next, methyl ethyl ketone was added to the obtained mixture so that the total solids ratio was 30% by mass, and then, the mixture was mixed in a sand mill. Then, the mixture was further adjusted to a viscosity of 10 to 12 cps with methyl ethyl ketone to prepare a surface layer forming paint.

The previously made elastic roller D-1 was immersed in the surface layer forming paint to form a coating of the paint on the surface of the elastic layer of the elastic roller D-1, and dried. The elastic roller D-1 was further heat-treated at a temperature of 150° C. for 1 hour to provide a surface layer having a film thickness of about 15 μm on the outer periphery of the elastic layer to make an electro-conductive roller according to Example 1.

The fact that the surface layer according to the present invention has the structure of the structure (1) and at least one structure selected from the group consisting of the structure of the structure (2) and the structure of the structure (3) can be confirmed by, for example, analysis by pyrolysis GC/MS, FT-IR or NMR.

For the surface layer (electro-conductive layer) obtained in this Example, analysis was performed using a pyrolysis apparatus (trade name: Curie Point Pyrolyzer Auto sampler JPS-700, manufactured by Japan Analytical Industry Co., Ltd.) and a GC/MS apparatus (trade name: Focus GC/ISQ, manufactured by Thermo Fisher Scientific K.K.), at a pyrolysis temperature of 590° C., and using helium as a carrier gas. As a result, from the obtained fragment peaks, it was confirmed that the surface layer had the structure represented by the structure (1) and at least one structure selected from the group consisting of the structure represented by the structure (2) and the structure represented by the structure (3).

For the electro-conductive roller according to Example 1 thus obtained, the following items were evaluated.

<Roller Resistance Value Evaluation>

For the measurement of the roller resistance value of an electro-conductive roller, the electro-conductive roller was allowed to stand in environments of 23° C. and 45% RH (hereinafter described as N/N) and 0° C. for 6 hours or more, and measurement was performed in the environments.

(Measurement of Roller Resistance)

Figure 4A:
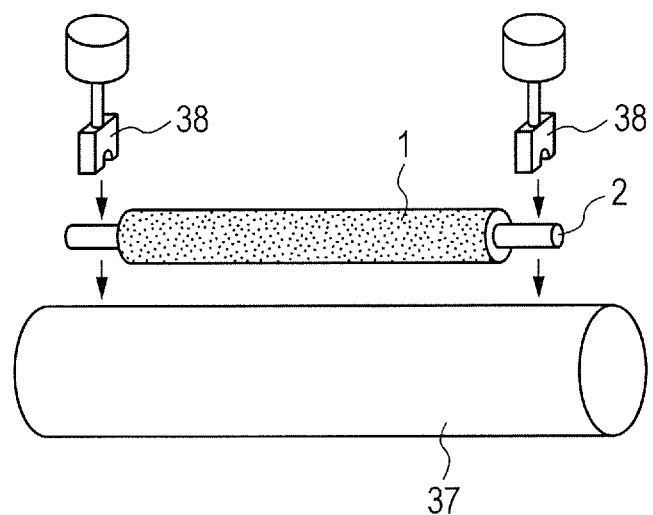
FIGS. 4A and 4B are schematic configuration diagrams of a jig for evaluating fluctuations in a roller resistance value according to the present invention.
Figure 4B:
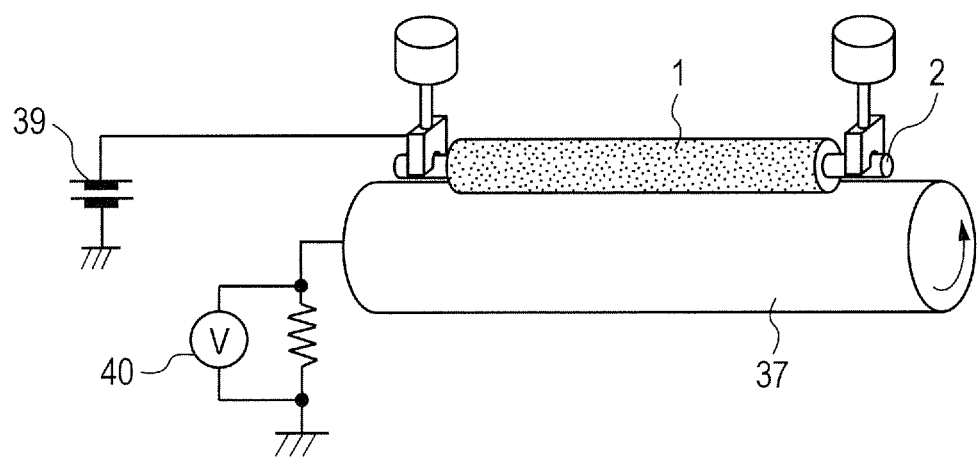

Schematic configuration diagrams of a jig for evaluating fluctuations in a roller resistance value are illustrated in FIGS. 4A and 4B. As illustrated in FIG. 4A, first, an electro-conductive roller 1 was allowed to abut a cylindrical metal 37 having a diameter of 40 mm while both ends of an electro-conductive mandrel 2 were pressed with a load of 4.9 N via electro-conductive bearings 38. Next, as illustrated in FIG. 4B, the cylindrical metal 37 was rotated in the state in which the electro-conductive roller 1 abutted the cylindrical metal 37 to drive the electro-conductive roller 1 to rotate at a speed of 60 rpm. Next, a voltage of 50 V was applied by a high voltage power supply 39, and the potential difference between both ends of a resistor having a known electrical resistance (an electrical resistance lower than the electrical resistance of the electro-conductive roller by two or more orders of magnitude) disposed between the cylindrical metal 37 and a ground was measured. For the measurement of the potential difference, a voltmeter 40 (189 TRUE RMS MULTIMETER manufactured by FLUKE) was used. The current flowing through the cylindrical metal via the electro-conductive roller 1 was obtained from the measured potential difference and the electrical resistance of the resistor by calculation. The applied voltage 50 V was divided by the obtained current to obtain the electrical resistance value of the electro-conductive roller 1.

Here, for the measurement of the potential difference, sampling was performed for 3 seconds from 2 seconds after voltage application, and the value calculated from the average value was taken as the roller resistance value.

(Measurement of Volume Swelling Ratio by Toluene Immersion Method)

A test piece for a volume swelling ratio by a toluene immersion method was made as follows using the surface layer forming paint of each Example.

The surface layer forming dispersion of each Example was added in a predetermined amount providing a film thickness of 200 μm to an aluminum die whose surface was provided with a fluororesin coating. Next, the aluminum die was placed on a sunflower stand, and the dispersion was dried until the viscosity increased to the extent that the surface of the film did not flow. Then, the aluminum die was placed on a horizontal table, and the dispersion was dried at room temperature for 2 hours. Then, the film was heated and cured at 140° C. for 60 minutes, cooled to room temperature, and then peeled from the aluminum die to fabricate a sheet having a film thickness of about 200 μm. The obtained sheet for a surface layer was cut to 50 mm×50 mm and allowed to stand in an environment of 23° C. and 40% RH for 24 hours to provide a test piece.

For the measurement of volume in the volume swelling ratio by a toluene immersion method, an electronic hydrometer EW-300SG (manufactured by Alfa Mirage Co., Ltd.) was used. In addition, for the measurement of the volume swelling ratio, three test pieces were made for each Example, measurement was performed for the test pieces, and the average value of the obtained results was used as the volume swelling ratio in the present invention.

First, the initial weight in air (W1) and the initial weight in water (W2) were measured in an environment of 23° C. and 40%. Next, the test piece after the initial weight measurement was immersed in toluene at 23° C. for 24 hours.

Soon after the test piece was removed from the toluene, the toluene on the surface was wiped off with nonwoven fabric, and the weight in air after immersion (W3) and the weight in water after immersion (W4) were measured in an environment of 23° C. and 40% again. The volume swelling ratio after toluene immersion was calculated by the following formula.

$$\text{volume swelling ratio}(\%) = ((W3-W4)-(W1-W2))/(W1-W2) \times 100$$

W1: initial weight in air
W2: initial weight in water
W3: weight in air after immersion
W4: weight in water after immersion <Evaluation as Developing Roller>
(Evaluation of Ghost in 0° C. Environment)

Next, using the electro-conductive roller after the roller resistance value was measured in the 0° C. environment as described above, the following evaluation was performed.

A laser printer (trade name, LBP7700C; manufactured by Canon Inc.), which was an electrophotographic apparatus having the configuration illustrated in FIG. 3, was loaded with the electro-conductive roller of this Example as a developing roller, installed in a 0° C. environment, and then allowed to stand for 2 hours. Then, a ghost image was evaluated in a 0° C. environment.

For the evaluation of a ghost image, a 15 mm×15 mm square solid black image in the tip portion followed by an entire surface halftone image were printed as image patterns on one A4 size sheet using black toner. Next, density unevenness in the developing roller cycle appearing in the halftone image portion on the obtained print was visually evaluated, and a ghost was evaluated according to the following criteria.
A: No ghost is noted at all
B: A very slight ghost is noted
C: A significant ghost is noted The results of Example 1 obtained by the above evaluation tests are shown in Table 7.

TABLE 5

| | Ionic compound | | Polyol | | Curing agent | |
|---|---|---|---|---|---|---|
| | No. | Part by mass | No. | Part by mass | No. | Part by mass |
| Example 1 | IP-1 | 5.0 | A-1 | 71.9 | MILLIONATE MR400 | 28.1 |
| Example 2 | IP-2 | | | | | |
| Example 3 | IP-3 | | | | | |
| Example 4 | IP-4 | | | | | |
| Example 5 | IP-5 | | | | | |
| Example 6 | IP-6 | | | | | |
| Example 7 | IP-7 | | | | | |
| Example 8 | IP-8 | | EXCENOL 500ED | 12.8 | B-1 | 124.5 |
| Example 9 | IP-9 | | | | | |
| Example 10 | IP-10 | | | | | |
| Example 11 | IP-11 | | | | | |
| Example 12 | IP-12 | | | | | |
| Example 13 | IP-13 | | | | | |
| Example 14 | IP-14 | | A-2 | 64.7 | B-2 | 50.5 |
| Example 15 | IP-15 | | | | | |
| Example 16 | IP-19 | 2.0 | A-1 | 39.7 | B-1 | 86.2 |
| Example 17 | IP-20 | | EXCENOL 500ED | 10.5 | B-2 | 127.9 |
| Example 18 | IP-19 | | A-3 | 81.1 | B-1 | 29.7 |
| Example 19 | IP-21 | | A-1 | 39.7 | B-1 | 86.2 |
| Example 20 | IP-16 | | EXCENOL 500ED | 10.5 | B-2 | 127.9 |
| Example 21 | IP-21 | | A-3 | 81.1 | B-1 | 29.7 |
| Example 22 | IP-1 | | A-1 | 39.7 | B-1 | 86.2 |
| Example 23 | IP-8 | | EXCENOL 500ED | 10.5 | B-2 | 127.9 |
| Example 24 | IP-1 | | A-3 | 81.1 | B-1 | 29.7 |
| Example 25 | IP-17 | | A-1 | 39.7 | B-1 | 86.2 |
| Example 26 | IP-18 | | EXCENOL 500ED | 10.5 | B-2 | 127.9 |
| Example 27 | IP-17 | | A-3 | 81.1 | B-1 | 29.7 |

Examples 2 to 7

The electrophotographic members of Examples 2 to 7 were made as in Example 1 except that the ionic compound was changed as described in Table 5.

Example 8

12.8 parts by mass of an ethylenediamine-based polyol (trade name: EXCENOL 500ED; manufactured by Asahi Glass Co., Ltd.), 124.5 parts by mass of the isocyanate group-terminated prepolymer B-1, 5.0 parts by mass of the ionic compound IP-8, 10.0 parts by mass of silica (trade name: AEROSIL 200; manufactured by NIPPON AEROSIL CO., LTD.) and 10.0 parts by mass of urethane resin fine particles (trade name: Art Pearl C-400; manufactured by Negami chemical industrial Co., Ltd) were stirred and mixed.

Subsequently, the electrophotographic member of Example 8 was made as in Example 1.

Examples 9 to 13

The electrophotographic members of Examples 9 to 13 were made as in Example 8 except that the ionic compound was changed as described in Table 5.

Example 14

64.7 parts by mass of the polyether polyol A-2, 50.5 parts by mass of the isocyanate group-terminated prepolymer B-2, 5.0 parts by mass of the ionic compound IP-(1,4-di-(2-hydroxyethyl)pyridinium dicyanamide), 10.0 parts by mass of silica (trade name: AEROSIL 200; manufactured by NIPPON AEROSIL CO., LTD.) and 10.0 parts by mass of urethane resin fine particles (trade name: Art Pearl C-800; manufactured by Negami chemical industrial Co., Ltd) were stirred and mixed.

Subsequently, the electrophotographic member of Example 14 was made as in Example 1.

Example 15

The electrophotographic member of Example 15 was made as in Example 14 except that the ionic compound was changed as described in Table 5.

Example 16

39.7 parts by mass of the polyether polyol A-1, 86.2 parts by mass of the isocyanate group-terminated prepolymer B-1, 2.0 parts by mass of the ionic compound IP-19 (tributylmethylammonium bis(trifluoromethanesulfonyl)imide; manufactured by TOKYO CHEMICAL INDUSTRY CO., LTD.), 10.0 parts by mass of silica (trade name: AEROSIL 200; manufactured by NIPPON AEROSIL CO., LTD.) and 10.0 parts by mass of urethane resin fine particles (trade name: Art Pearl C-800; manufactured by Negami chemical industrial Co., Ltd) were stirred and mixed.

Subsequently, the electrophotographic member of Example 16 was made as in Example 1.

Examples 19, 22 and 25

The electrophotographic members of Examples 19, 22 and 25 were made as in Example 16 except that the ionic compound was changed as described in Table 5.

Example 17

10.5 parts by mass of an ethylenediamine-based polyol (trade name: EXCENOL 500ED; manufactured by Asahi Glass Co., Ltd.), 127.9 parts by mass of the isocyanate group-terminated prepolymer B-2, 2.0 parts by mass of the ionic compound IP-20 (1-butyl-3-methylimidazolium trifluoromethanesulfonate; manufactured by Sigma-Aldrich), 10.0 parts by mass of silica (trade name: AEROSIL 200; manufactured by NIPPON AEROSIL CO., LTD.) and 10.0 parts by mass of urethane resin fine particles (trade name: Art Pearl C-400; manufactured by Negami chemical industrial Co., Ltd) were stirred and mixed.

Subsequently, the electrophotographic member of Example 17 was made as in Example 1.

Examples 20, 23 and 26

The electrophotographic members of Examples 20, 23 and 26 were made as in Example 17 except that the ionic compound was changed as described in Table 5.

Example 18

81.1 parts by mass of the hydroxyl group-terminated urethane prepolymer A-3, 29.7 parts by mass of the isocyanate group-terminated prepolymer B-1, 2.0 parts by mass of the ionic compound IP-19 (tributylmethylammonium bis(trifluoromethanesulfonyl)imide; manufactured by TOKYO CHEMICAL INDUSTRY CO., LTD.), 10.0 parts by mass of silica (trade name: AEROSIL 200; manufactured by NIPPON AEROSIL CO., LTD.) and 10.0 parts by mass of urethane resin fine particles (trade name: Art Pearl C-400; manufactured by Negami chemical industrial Co., Ltd) were stirred and mixed.

Subsequently, the electrophotographic member of Example 18 was made as in Example 1.

Examples 21, 24 and 27

The electrophotographic members of Examples 21, 24 and 27 were made as in Example 18 except that the ionic compound was changed as described in Table 5.

Comparative Example 1

87.7 parts by mass of a polybutadiene-based polyol (trade name: Poly bd R-45HT; manufactured by Idemitsu Kosan Co., Ltd.), 12.3 parts by mass of polymeric MDI (trade name: MILLIONATE MR-400; manufactured by NIPPON POLYURETHANE INDUSTRY CO., LTD.), 2.0 parts by mass of the ionic compound IP-19 (tributylmethylammonium bis(trifluoromethanesulfonyl)imide; manufactured by TOKYO CHEMICAL INDUSTRY CO., LTD.), 10.0 parts by mass of silica (trade name: AEROSIL 200; manufactured by NIPPON AEROSIL CO., LTD.) and 10.0 parts by mass of urethane resin fine particles (trade name: Art Pearl C-400; manufactured by Negami chemical industrial Co., Ltd) were stirred and mixed.

Subsequently, the electrophotographic member of Comparative Example 1 was made as in Example 1.

Comparative Example 2

82.8 parts by mass of a polytetramethylene glycol-based polyol (trade name: PTG3000; manufactured by Hodogaya Chemical Co., Ltd.), 34.4 parts by mass of a TDI-based isocyanate (trade name: CORONATE 2030; manufactured by NIPPON POLYURETHANE INDUSTRY CO., LTD.), 2.0 parts by mass of the ionic compound IP-20 (1-butyl-3-methylimidazolium trifluoromethanesulfonate; manufactured by Sigma-Aldrich), 10.0 parts by mass of silica (trade name: AEROSIL 200; manufactured by NIPPON AEROSIL CO., LTD.) and 10.0 parts by mass of urethane resin fine particles (trade name: Art Pearl C-400; manufactured by Negami chemical industrial Co., Ltd) were stirred and mixed.

Subsequently, the electrophotographic member of Comparative Example 2 was made as in Example 1.

TABLE 6

| | Ionic compound | | Polyol | | Curing agent | |
|---|---|---|---|---|---|---|
| | No. | Part by mass | No. | Part by mass | No. | Part by mass |
| Comparative Example 1 | IP-19 | 2.0 | Poly bd R-45HT | 87.7 | MILLIONATE MR400 | 12.3 |
| Comparative Example 2 | IP-20 | | PTG-3000 | 82.8 | CORONATE 2030 | 34.4 |
| Comparative Example 3 | IP-22 | | A-1 | 71.9 | MILLIONATE MR400 | 28.1 |
| Comparative Example 4 | IP-23 | | | | | |
| Comparative Example 5 | IP-24 | | | | | |

Comparative Examples 3, 4 and 5

The electrophotographic members of Comparative Examples 3, 4 and 5 were made as in Example 1 except that the ionic compound was changed as described in Table 6.

The electro-conductive rollers and sheets according to the above Examples 2 to 27 and Comparative Examples 1 to 5 were evaluated as in Example 1. The results are shown in Table 7.

TABLE 7

| | Ionic compound | Number of crosslinking points between ionic compound and urethane | Binder | N/N roller resistance (Ω) | 0° C. roller resistance (Ω) | (0° C. resistance)/ (N/N resistance) | Volume swelling ratio (%) | 0° C. ghost |
|---|---|---|---|---|---|---|---|---|
| Example 1 | IP-1 | 2 | A-1/ MR-400 | 2.63E+06 | 6.63E+07 | 25.2 | 5.0% | A |
| Example 2 | IP-2 | | | 7.13E+05 | 5.50E+07 | 77.2 | 5.7% | A |
| Example 3 | IP-3 | | | 1.19E+06 | 8.13E+07 | 68.4 | 5.0% | A |
| Example 4 | IP-4 | | | 3.13E+06 | 9.38E+07 | 30.0 | 5.7% | B |
| Example 5 | IP-5 | | | 7.25E+05 | 3.13E+07 | 43.1 | 7.5% | A |
| Example 6 | IP-6 | | | 1.13E+06 | 3.63E+07 | 32.2 | 6.7% | A |
| Example 7 | IP-7 | | | 1.88E+06 | 8.25E+07 | 44.0 | 7.5% | A |
| Example 8 | IP-8 | 2 | EL-500ED/ B-1 | 1.63E+06 | 5.50E+07 | 33.8 | 14.1% | A |
| Example 9 | IP-9 | | | 1.63E+06 | 9.25E+07 | 56.9 | 15.8% | B |
| Example 10 | IP-10 | | | 5.71E+05 | 2.14E+07 | 37.5 | 14.1% | A |
| Example 11 | IP-11 | | | 9.88E+05 | 6.88E+07 | 69.6 | 12.0% | A |
| Example 12 | IP-12 | | | 7.88E+05 | 5.00E+07 | 63.5 | 15.9% | A |
| Example 13 | IP-13 | | | 1.38E+06 | 9.50E+07 | 69.1 | 13.0% | B |
| Example 14 | IP-14 | 2 | A-2/B-2 | 1.16E+06 | 4.88E+07 | 41.9 | 63.0% | A |
| Example 15 | IP-15 | | | 1.63E+06 | 5.13E+07 | 31.5 | 82.8% | A |
| Example 16 | IP-19 | 0 | A-1/B-1 | 9.60E+05 | 1.50E+07 | 15.6 | 44.0% | A |
| Example 17 | IP-20 | | EL-500ED/ B-2 | 7.20E+05 | 7.92E+06 | 11.0 | 35.0% | A |
| Example 18 | IP-19 | | A-3/B-1 | 8.82E+05 | 1.21E+07 | 13.7 | 56.4% | A |
| Example 19 | IP-21 | | A-1/B-1 | 6.00E+05 | 5.50E+06 | 9.2 | 41.6% | A |
| Example 20 | IP-16 | 1 | EL-500ED/ B-2 | 5.40E+05 | 3.93E+06 | 7.3 | 35.0% | A |
| Example 21 | IP-21 | | A-3/B-1 | 5.75E+05 | 5.58E+06 | 9.7 | 59.3% | A |
| Example 22 | IP-1 | 2 | A-1/B-1 | 2.92E+05 | 7.67E+05 | 2.6 | 40.6% | A |
| Example 23 | IP-8 | | EL-500ED/ B-2 | 5.75E+05 | 1.83E+06 | 3.2 | 31.9% | A |
| Example 24 | IP-1 | | A-3/B-1 | 4.92E+05 | 3.08E+06 | 6.3 | 54.4% | A |
| Example 25 | IP-17 | 3 | A-1/B-1 | 3.92E+05 | 7.42E+05 | 1.9 | 44.0% | A |
| Example 26 | IP-18 | | EL-500ED/ B-2 | 5.75E+05 | 2.67E+06 | 4.6 | 20.8% | A |
| Example 27 | IP-17 | | A-3/B-1 | 2.33E+05 | 7.25E+05 | 3.1 | 58.4% | A |
| Comparative Example 1 | IP-19 | 0 | R-45RT/ MR-400 | 6.50E+07 | 8.10E+09 | 124.6 | 9.5% | C |
| Comparative Example 2 | IP-20 | | PTG3000/ CORONATE 2030 | 4.40E+07 | 7.80E+09 | 177.3 | 21.4% | C |
| Comparative Example 3 | IP-22 | | A-1/ MR-400 | 9.50E+07 | 7.90E+09 | 83.2 | 10.5% | C |
| Comparative Example 4 | IP-23 | | | 9.60E+08 | 8.10E+09 | 8.4 | 7.8% | C |
| Comparative Example 5 | IP-24 | | | 6.50E+08 | 8.80E+09 | 13.5 | 8.5% | C |

Examples 1 to 27 contain in the surface layer a resin having the structure represented by the structure (1) and at least one structure selected from the group consisting of the structure represented by the structure (2) and the structure represented by the structure (3) according to the present invention, and at least one anion selected from a fluorinated sulfonylimide anion, a fluorinated sulfonylmethide anion, a fluorinated sulfonate anion, a fluorinated carboxylate anion, a fluorinated borate anion, a fluorinated phosphate anion, a fluorinated arsenate anion, a fluorinated antimonate anion, a dicyanamide anion and a bis(oxalato)borate anion, and therefore, an increase in resistance in a low temperature environment around 0° C. is small, and the image quality is also kept well.

Particularly, in Examples 16 to 27 in which the volume swelling ratio by the toluene immersion method is 20% or more and 60% or less, resistance increase is suppressed at a higher level.

On the other hand, in Comparative Examples 1 and 2 not containing the structure represented by the structure (1) and at least one structure selected from the group consisting of the structure represented by the structure (2) and the structure represented by the structure (3) according to the present invention, and Comparative Examples 3, 4 and 5 not containing the anion according to the present invention, resistance increase in a low temperature environment around 0° C. was noted, and the occurrence of a ghost image was noted.

<Evaluation as Charging Roller>

Example 28

The previously made elastic roller D-2 was immersed in the surface layer forming paint prepared in Example 1 to form a coating of the paint on the surface of the elastic layer of the elastic roller D-2, and dried. Subsequently, an electro-conductive roller according to Example 28 was made as in Example 1.

Example 29

An electro-conductive roller according to Example 29 was made as in Example 28 except that the surface layer forming paint was changed to the surface layer forming paint prepared in Example 16.

Example 30

An electro-conductive roller according to Example 30 was made as in Example 28 except that the surface layer forming paint was changed to the surface layer forming paint prepared in Example 26.

Comparative Example 6

An electro-conductive roller according to Comparative Example 6 was made as in Example 28 except that the surface layer forming paint was changed to the surface layer forming paint prepared in Comparative Example 2.

Comparative Example 7

An electro-conductive roller according to Comparative Example 7 was made as in Example 28 except that the surface layer forming paint was changed to the surface layer forming paint prepared in Comparative Example 4.

For the electro-conductive rollers according to the above Examples 28, 29 and 30 and Comparative Examples 6 and 7, the roller resistance value was measured.

(Measurement of Roller Resistance of Electro-Conductive Rollers according to Examples 28 to 30 and Comparative Examples 6 and 7)

Schematic configuration diagrams of a jig for evaluating fluctuations in a roller resistance value are illustrated in FIGS. 4A and 4B. As illustrated in FIG. 4A, first, an electro-conductive roller 1 was allowed to abut a cylindrical metal 37 having a diameter of 30 mm while both ends of an electro-conductive mandrel 2 were pressed with a load of 4.9 N via electro-conductive bearings 38. Next, as illustrated in FIG. 4B, the cylindrical metal 37 was rotated at a speed of 30 rpm in the state in which the electro-conductive roller 1 abutted the cylindrical metal to drive the electro-conductive roller 1 to rotate. Next, a voltage of 200 V was applied by a high voltage power supply 39, and the potential difference between both ends of a resistor having a known electrical resistance (an electrical resistance lower than the electrical resistance of the electro-conductive roller by two or more orders of magnitude) disposed between the cylindrical metal 37 and a ground was measured. For the measurement of the potential difference, a voltmeter 40 (189 TRUE RMS MULTIMETER manufactured by FLUKE) was used. The current flowing through the cylindrical metal via the electro-conductive roller 1 was obtained from the measured potential difference and the electrical resistance of the resistor by calculation. The applied voltage 200 V was divided by the obtained current to obtain the electrical resistance value of the electro-conductive roller 1.

Here, for the measurement of the potential difference, sampling was performed for 3 seconds from 2 seconds after voltage application, and the value calculated from the average value was taken as the roller resistance value.

Evaluation was performed as in Example 1 regarding the environments and standing time in the roller resistance measurement.

Further, using these electro-conductive rollers according to Examples 28 to 30 and Comparative Examples 6 and 7 as charging rollers, the following evaluation was performed. The results are shown in Table 8.

(Horizontal Streak Image Evaluation in 0° C. Environment)

Due to an increase in the resistance of a charging roller, fine streak-like density unevenness may occur in a halftone image. This is referred to as a horizontal streak image. This horizontal streak image tends to be more likely to occur as the resistance increases, and tends to be conspicuous with long-term utilization. The electro-conductive rollers obtained in the above Examples and Comparative Examples were incorporated as a charging roller, and the following evaluation was performed.

A laser printer (trade name: HP Color Laserjet Enterprise CP4515dn manufactured by HP), which was an electrophotographic apparatus, was loaded with each of the electro-conductive rollers obtained in Examples 28, 29 and 30 and Comparative Examples 6 and 7 as a charging roller, installed in a 0° C. environment, and then allowed to stand for 2 hours. Then, an endurance test in which images having a printing density of 4% (images in which horizontal lines having a width of 2 dots and intervals of 50 dots were drawn in the direction perpendicular to the rotation direction of the photosensitive member) were continuously output was performed in a 0° C. environment. In addition, after 24000 images were output (after the endurance test), a halftone image (an image in which horizontal lines having a width of 1 dot and intervals of 2 dots were drawn in the direction perpendicular to the rotation direction of the photosensitive member) was output for image check. The obtained image was visually observed, and horizontal streaks were evaluated.

A: a level at which no horizontal streaks occur at all
B: a level at which horizontal streaks occur slightly only at the image ends
C: a level at which horizontal streaks occur in substantially half the region of the image and are conspicuous

TABLE 8

| | Ionic compound | Number of crosslinking points between ionic compound and urethane | Binder | N/N roller resistance (Ω) | 0° C. roller resistance (Ω) | (0° C. resistance)/ (N/N resistance) | 0° C. horizontal streaks |
|---|---|---|---|---|---|---|---|
| Example 28 | IP-1 | 2 | A-1/ MR-400 | 2.10E+07 | 5.30E+08 | 25.2 | A |
| Example 29 | IP-19 | 0 | A-1/ B-1 | 3.50E+06 | 2.50E+07 | 7.1 | A |
| Example 30 | IP-18 | 3 | EL-500ED/ B-2 | 6.90E+06 | 1.60E+07 | 2.3 | A |
| Comparative Example 6 | IP-20 | 0 | PTG3000/ CORONATE 2030 | 4.40E+07 | 7.80E+09 | 177.3 | C |
| Comparative Example 7 | IP-23 | | A-1/ MR-400 | 9.60E+08 | 8.10E+09 | 8.4 | C |

Examples 28 to 30 contain in the surface layer a resin having the structure represented by the structure (1) and at least one structure selected from the group consisting of the structure represented by the structure (2) and the structure represented by the structure (3) according to the present invention, and at least one anion selected from a fluorinated sulfonylimide anion, a fluorinated sulfonylmethide anion, a fluorinated sulfonate anion, a fluorinated carboxylate anion, a fluorinated borate anion, a fluorinated phosphate anion, a fluorinated arsenate anion, a fluorinated antimonate anion, a dicyanamide anion and a bis(oxalato)borate anion, and therefore, an increase in resistance in a low temperature environment around 0° C. is small, and the image quality is also kept well.

Particularly, in Examples 29 and 30 in which the volume swelling ratio by the toluene immersion method is 20% or more and 60% or less, resistance increase is suppressed at a higher level.

On the other hand, in Comparative Example 6 not containing the structure represented by the structure (1) and at least one structure selected from the group consisting of the structure represented by the structure (2) and the structure represented by the structure (3) according to the present invention, and Comparative Example not containing the anion according to the present invention, resistance increase in a low temperature environment around 0° C. was noted, and the occurrence of horizontal streaks was noted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-102659, filed May 16, 2014, which is hereby incorporated by reference herein in its entirety.

What is claimed is:

1. An electrophotographic member comprising an electro-conductive mandrel and an electro-conductive layer, the electro-conductive layer comprising:
   an ion-conductive agent containing at least one anion selected from the group consisting of a fluorinated sulfonylimide anion, a fluorinated sulfonylmethide anion, a fluorinated sulfonate anion, a fluorinated carboxylate anion, a fluorinated borate anion, a fluorinated phosphate anion, a fluorinated arsenate anion, a fluorinated antimonate anion, a dicyanamide anion and a bis(oxalato)borate anion; and
   a urethane resin to which a cation of the ion conductive agent is chemically bonded, wherein
   the urethane resin has, between two adjacent urethane bonds, (i) a structure represented by structure (1)

and (ii) at least one structure of structure (2) or structure (3)

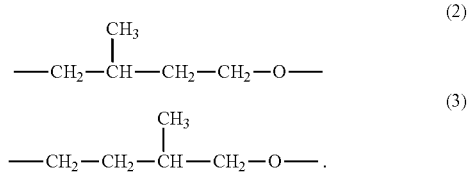

2. The electrophotographic member according to claim 1, wherein a volume swelling ratio of the electro-conductive layer by a toluene immersion method is 20 to 60%.

3. The electrophotographic member according to claim 1, wherein the urethane resin is obtained by thermally curing either one or both of:
   an isocyanate group-terminated prepolymer obtained by reacting a polyether polyol having the structure represented by the structure (1) and at least one structure selected from the structure represented by the structure (2) and the structure represented by the structure (3) with a polyisocyanate; and
   a hydroxyl group-terminated prepolymer obtained by reacting a polyether polyol having the structure represented by the structure (1) and at least one structure selected from the structure represented by the structure (2) and the structure represented by the structure (3) with a diisocyanate.

* * * * *